United States Patent
Koskimies

(10) Patent No.: US 7,376,697 B2
(45) Date of Patent: May 20, 2008

(54) ARRANGEMENT OF DATA SYNCHRONIZATION IN A TELECOMMUNICATIONS SYSTEM

(75) Inventor: Oskari Koskimies, Helsinki (FI)

(73) Assignee: Nokia Corporation, Espoo (FI)

( * ) Notice: Subject to any disclaimer, the term of this patent is extended or adjusted under 35 U.S.C. 154(b) by 605 days.

(21) Appl. No.: 10/292,086

(22) Filed: Nov. 11, 2002

(65) Prior Publication Data

US 2003/0115301 A1    Jun. 19, 2003

(30) Foreign Application Priority Data

Nov. 12, 2001   (FI)   ................... 20012185

(51) Int. Cl.
G06F 15/16 (2006.01)
G06F 12/00 (2006.01)
G06F 15/177 (2006.01)

(52) U.S. Cl. ............... 709/203; 707/201; 707/E17.005; 709/221

(58) Field of Classification Search ............ None
See application file for complete search history.

(56) References Cited

U.S. PATENT DOCUMENTS

| | | | |
|---|---|---|---|
| 5,974,238 A | 10/1999 | Chase, Jr. | |
| 6,223,187 B1 | 4/2001 | Boothby et al. | |
| 6,401,104 B1 * | 6/2002 | LaRue et al. | 707/203 |
| 6,457,062 B1 * | 9/2002 | Pivowar et al. | 709/248 |
| 6,810,405 B1 * | 10/2004 | LaRue et al. | 707/201 |
| 2004/0049599 A1 * | 3/2004 | Friend et al. | 709/248 |

FOREIGN PATENT DOCUMENTS

| | | |
|---|---|---|
| EP | 1 014 266 A2 | 6/2000 |
| EP | 1 130 511 A2 | 9/2001 |
| WO | WO 96/21898 | 7/1996 |
| WO | WO 00/62201 | 10/2000 |
| WO | WO 01/37092 A1 | 5/2001 |

OTHER PUBLICATIONS

*SyncML Sync Protocol, version 1.0.1*, Jun. 15, 2001 (pp. 12-13).
"SyncML—Getting the mobile Internet in sync", Ericsson Review, Vol. No. 3, 2001, pp. 110-115.

* cited by examiner

*Primary Examiner*—Wen-Tai Lin
(74) *Attorney, Agent, or Firm*—Hollingsworth & Funk, LLC

(57) ABSTRACT

The invention relates to a method of detecting duplicates in a synchronization system comprising at least one client device and at least two synchronization servers. The method comprises the steps of allocating first identifiers to the data units to be synchronized for use in the client device and second identifiers for use in the synchronization server; maintaining mapping tables for the synchronization servers by adding to the mapping table first identifiers and second identifiers allocated to the data units to be synchronized via the synchronization server. The method further comprises the steps of comparing the identifier pairs formed by the first and second identifiers added to the mapping tables of different synchronization servers; and causing at least part of the identifier pairs of the mapping tables to correspond to each other.

15 Claims, 3 Drawing Sheets

US 7,376,697 B2

ARRANGEMENT OF DATA SYNCHRONIZATION IN A TELECOMMUNICATIONS SYSTEM

BACKGROUND OF THE INVENTION

The invention relates to arrangement of data synchronization, in particular to detection of data unit duplicates, in a communications system comprising several synchronization servers. Data synchronization is a function in which correspondence is formed between two data collections in such a way that the data units of the data collections substantially correspond to each other after the synchronization.

Data of portable terminals, such as computers, PDA (Personal Digital Assistant) devices, mobile stations or pagers can be synchronized with databases of network applications, desktop applications or other databases of a communications system. Typically, it is specifically data of calendar and e-mail applications that is synchronized. Synchronization has previously been based on the use of different manufacturer-specific protocols that are not compatible with each other. This restricts the use of different terminals and data types and is frequently difficult for the user. In mobile communication, in particular, it is important to get data acquired and updated irrespective of the terminal or application used. The SyncML (Synchronization Markup Language) has been developed based on the XML language (Extensible Markup Language) for more practical synchronization. The SyncML synchronization protocol using messages in SyncML format allows data of any application to be synchronized between any networked terminals.

FIG. 1 illustrates a synchronization system in which a mobile station MS functions as the client device and network servers S function as the synchronization servers. The client device MS transfers the changes having taken place in the data set under synchronization after the preceding synchronization round to the server S, which synchronizes the data, i.e. analyzes the changes made in the data of the client device MS and the database under synchronization, and makes uniform the data (makes the required modifications, replacements and deletions). After this, the server S returns the changes to the client device (MS), which changes the data set in accordance with the changes. Conventionally, in client-server synchronization the client device and the server have identifiers of their own for the data unit. As described for example in the SyncML specification 'SyncML Sync Protocol, version 1.0.1', June 2001, Chapter 2.3 (pages 12-13), identifiers used in the server are called global unique identifiers GUID that are always as unambiguous as possible, in other words they cannot be mixed up with each other. Identifiers of a client device are called local unique identifiers LUID. LUID identifiers are shorter in order to save memory, and the synchronization server maintains a mapping table between the GUID and LUID identifiers. The client device can synchronize data with several servers S, and also the servers S can synchronize data with each other. One simple example of this is that a data unit A is added to a desktop and allocated the identifier GUID1. The desktop synchronizes with mobile stations, whereby it is further allocated the identifier LUID1. When the desktop and the e-mail server have synchronized, the data unit A is recorded with the identifier GUID1 also in the e-mail server. When the mobile server synchronizes with the e-mail server, the e-mail server does not recognize the identifier LUID1. The e-mail server records the data unit and allocates it a new identifier GUID2. After this, the data unit A has been recorded in the e-mail server (i.e. its database) twice. This is called the loop problem of synchronization, which causes redundant data transmission and consumption of memory capacity when unnecessary duplicates are recorded.

BRIEF DESCRIPTION OF THE INVENTION

An object of the invention is thus to provide a method and means implementing the method in such a way that the above-mentioned problems caused by duplicates can be avoided. The objects of the invention are achieved with methods, a synchronization system, a synchronization device and a computer program product, which are characterized in what is stated in the independent claims. Preferred embodiments of the invention are disclosed in the dependent claims.

The invention is based on comparing mapping tables maintained for servers that map first identifiers used in a client device to second identifiers used in servers. In accordance with a first aspect of the invention, at least part of the identifier pairs of the mapping tables are caused to correspond to each other. Thus, at least identifier pairs missing from the mapping table may be added. In accordance with a second aspect of the invention, storing a data unit to be synchronized is prevented on the basis of the comparison of the mapping tables and as a response to the storing of a data unit according to the first identifier allocated to said data unit being detected. Maintaining mapping tables refers to storing of first and second identifiers in a mapping table of any format after the allocation of the identifiers, for instance as a response to the reception of a new data unit. It is to be noted that the term server refers to a block providing service functions of client-server architecture, and correspondingly, the term client device refers to a block providing client device functions of synchronization, without being necessarily restricted to a particular physical server device. In the same computer, there may be software components performing functionality of both the server and the client device.

An advantage of the solution is that the data unit identifiers added to some mapping table can also be updated to other mapping tables. Such updating of mapping tables allows avoidance of the loop problem (by preventing creation of duplicates and/or by detecting and deleting duplicates already formed) if all devices in the system use the method according to the invention. Even if some devices in the system do not use the method according to the invention, the application of the invention will alleviate the loop problem to a great extent, because the devices according to the invention can still prevent the formation of duplicates and recognize duplicates already brought about, whereby they can be deleted.

In accordance with a preferred embodiment of the invention, at least one mediator is used which maintains mapping tables for servers, compares identifier pairs of different mapping tables and updates identifier pairs of the mapping table on the basis of the comparison. Following advantages are achieved with the use of mediators: no changes are required for serves already in use; and the servers do not have to maintain mapping tables, but maintenance of mapping tables of even a plurality of servers can be centralized in a separate mediator. The centralization of services of different servers in the same mediator makes the operation and control of mediators more efficient.

In accordance with a preferred embodiment of the invention, the formed duplicates are deleted on the basis of the comparison in such a way that during the next synchronization session, at least one data unit duplicate is deleted if the same first identifier and/or the same second identifier exists for at least two data units. In this way, the duplicates that have been formed due to the loop problem, for instance, can be deleted.

BRIEF DESCRIPTION OF THE FIGURES

The invention will now be described in more detail by means of preferred embodiments, with reference to the attached figures, of which

DETAILED DESCRIPTION OF THE INVENTION

In the following, a preferred embodiment of the invention is described in a system supporting the SyncML standard. However, it is to be noted that the invention can be applied to any synchronization system.

Figure 1:
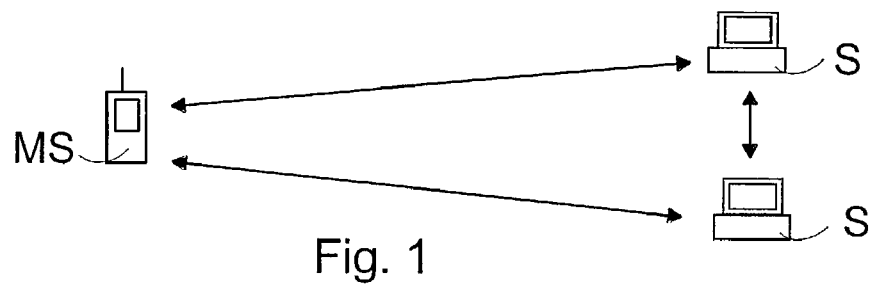
FIG. 1 shows a synchronization system.
Figure 2A:
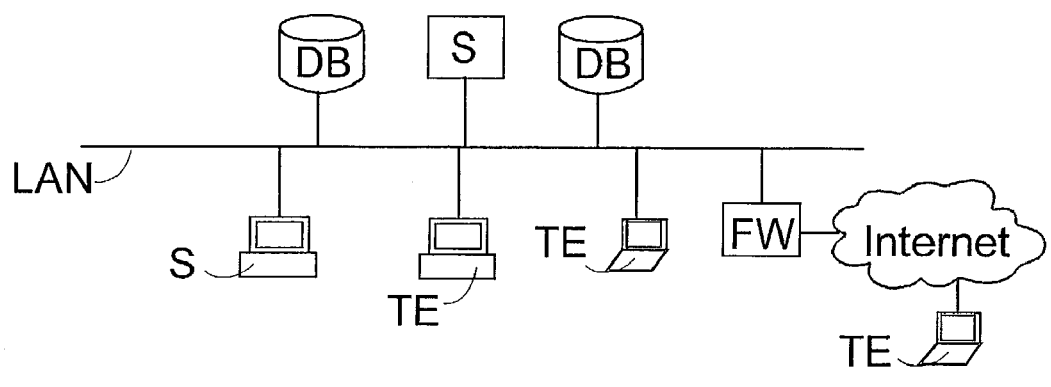
FIG. 2a shows a second synchronization system.
Figure 2A:
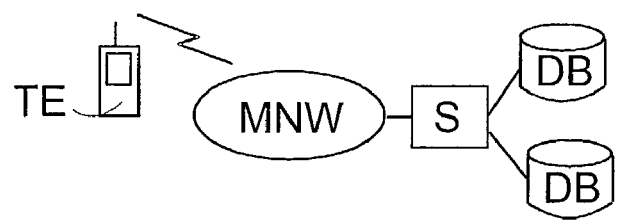

FIG. 2a illustrates a networked system in which data of the databases can be synchronized between synchronization servers S and terminals TE, between terminals TE or between servers S. The terminal TE can function as the client device with regard to synchronization and comprise thus a database to be synchronized. The server S can serve several client devices TE. FIG. 2a includes two examples, in the first of which client devices TE and synchronization servers S are connected to a local area network LAN. The client device TE connected to the network LAN comprises functionality, for instance a network interface card and software controlling data communication, for communicating with the devices in the network LAN. The local area network LAN can be a network of any type, and the TE can communicate with the server S also via the Internet, typically using a firewall FW. In a second example, the client device TE communicates with the server S via a mobile network (MNW). The client device TE connected to the network MNW comprises mobile station functionality for communicating with the network MNW in a wireless manner. There may also be other networks, such as a local area network LAN, between the mobile network MNW and the server S. The mobile network MNW can be any known wireless network, for instance a network supporting the GSM service, a network supporting the GPRS service (General Packet Radio Service), a third-generation mobile network, such as the UMTS (Universal Mobile Telecommunications System) network, a wireless local area network WLAN or a private network. It is to be noted that the server S can in itself comprise the database it synchronizes, or the database it synchronizes can be located in another device; in FIG. 2a the servers S and the databases DB are separated for the sake of illustration.

Figure 2B:
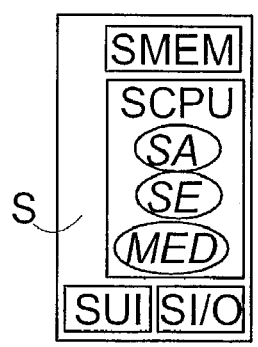
FIG. 2b shows a SyncML server device.
Figure 3:
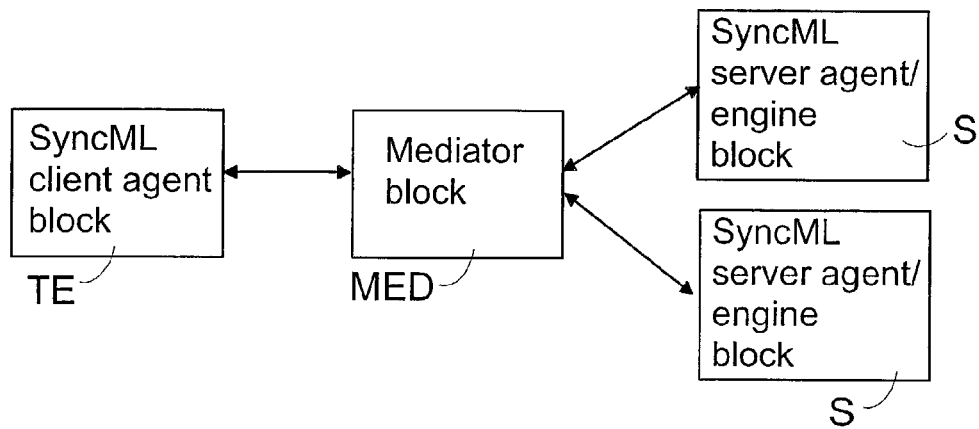
FIG. 3 shows functional blocks according to a preferred embodiment of the invention.
Figure 4:
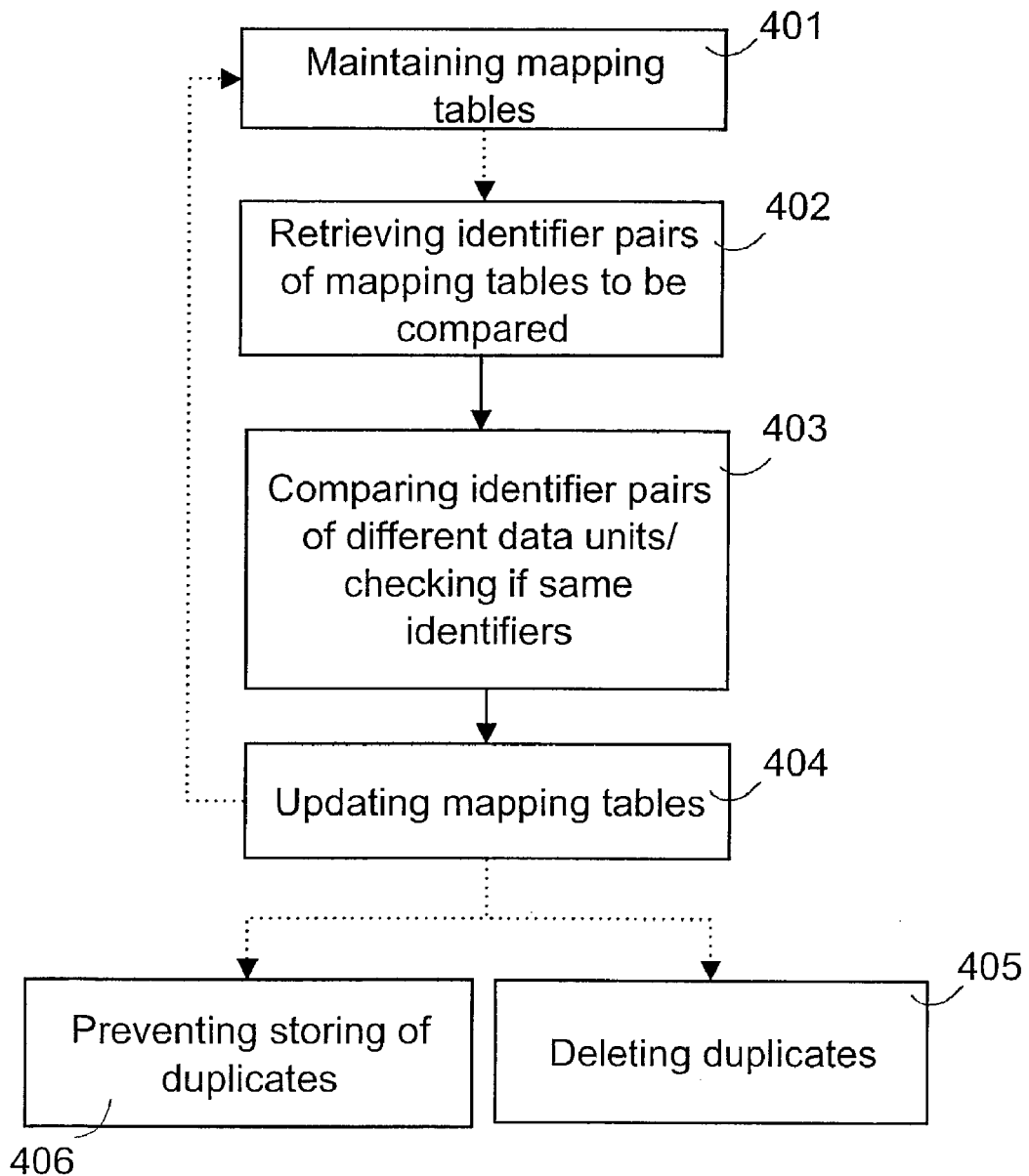
FIG. 4 shows a flow chart of a method according to a preferred embodiment of the invention.

As illustrated in FIG. 2b, the server S comprises memory SMEM, a user interface SUI, I/O means SI/O for arranging data transmission and a central processing unit SCPU comprising one or more processors. The memory SMEM contains a non-volatile part for storing applications controlling the central processing unit SCPU and other data to be stored, and a volatile part to be used for temporary data processing. The synchronization server S implements a synchronization agent SA and a synchronization engine block SE, preferably by executing in the SCPU computer program code stored in the memory SMEM. The computer program code executed in the central processing unit SCPU allows the operation of the server S to be supplemented with inventive features, some preferred embodiments of which are illustrated in FIGS. 3 and 4. The computer programs can be obtained via a network and/or recorded in memory means, for instance on a disk, CD-ROM disk or other external memory means, from which they can be loaded to the memory SMEM. Also hardware solutions or a combination of hardware and software solutions can be used.

In a conventional SyncML synchronization service, a synchronization session is first initialized, which includes for instance selection of the database to be synchronized. The SyncML client device TE comprises a synchronization client agent (Sync Client Agent) that attends to the functions relating to the synchronization session in the client device. The Sync client agent sends the server synchronization agent SA a SyncML message (client modifications), which contains at least the data being the object of the synchronization in the client device TE and having changed after the preceding synchronization. The synchronization block SE of the server S analyses the differences and uniforms the data sets. After this, the SA returns the modifications made in the server S (server modifications) to the client agent, which makes the necessary modifications to the TE database. The SyncML synchronization protocol can be implemented, for example, on top of the HTTP protocol (Hyper Text Transfer Protocol), the WSP protocol (Wireless Session Protocol) of the WAP (Wireless Application Protocol) standard, the OBEX protocol used for cable links, such as the USB (Universal Serial Bus) or RS-232, or for short-range radio frequency (Bluetooth) links or infrared (IrDA) links, on top of a TCP/IP (Transport Control Protocol/Internet Protocol) stack, and also on top of an e-mail protocol (SMTP, Simple Mail Transfer Protocol).

FIG. 3 illustrates a functional arrangement in which a mediator block MED has been provided in addition to a block providing the functionality of a SyncML client device and a block providing the functionality of a SyncML synchronization server S (synchronization agent block SA and synchronization engine block SE). The SyncML messages between the TE and the S travel through the mediator MED. Preferably, also the data transmission between the servers S is arranged through the mediator. The main tasks of the mediator MED include maintaining a GUID-LUID mapping table for at least one server; transmitting the synchronization messages between the server S and the client devices (TE) by means of the mapping table in such a way that a data unit is identified to the server with a GUID identifier allocated to it, and to the client device TE with an LUID identifier allocated to it; comparing identifier pairs in different tables; and updating mapping tables. The MED can be implemented in a plurality of ways; preferably it is implemented by software executed in the SCPU of the server S (in FIG. 2b a separate block MED or a supplement to the synchronization block SE). A separate device can also be used which functions as the mediator. In accordance with a preferred embodiment of the invention, connections to a data system, for example connections to the server S in an intranet of a company, are only allowed via a reliable mediator MED. The mediator MED can also function as a trusted third party in the communication between the servers S, in which case it can provide an authentication of the server reliability.

One mediator MED can serve several servers S, or there may be a separate mediator MED for each server S. The mediator can be positioned close to the client device TE, and different additional functionalities, such as caching functionalities, can be provided with it. In such a case, the mediator can be positioned in such a way that congestionless transmission can be guaranteed between the client device and the mediator. Centralizing mapping tables of several servers in a single mediator makes the operation and control of the mediators more efficient. A system using mediators MED can be compatible with the SyncML standard, because from the point of view of the client device, the mediator functions like a server.

As shown in Table 1, the GUID identifiers identifying the data units in the server are mapped in the mapping table to the LUID identifiers used in the client devices TE. Mapping tables can naturally be implemented in a plurality of ways; preferably, at least, for each server there is a separate mapping table, whereby in the mapping table, identifiers are added to data units added to the server or synchronized through it. There can also be a separate mapping table for each client device having synchronized with a server.

TABLE 1

| GUID | LUID |
| --- | --- |
| 10203040 | 12 |
| 10406080 | 14 |
| 15689421 | |

If there is no GUID identifier (i.e. the data unit does not arrive from another server), the server S itself allocates it. If the data unit has not yet resided in the client device TE, there is no LUID identifier in the mapping table. Thus, an LUID identifier can be added to the pair of identifiers during the synchronization with the client device.

As shown in Table 2, data units are stored in the database maintained by the server S in accordance with the GUID identifiers allocated to the data units, for instance the data unit 'Email 1' is identified with the identifier '10203040'. The data in Tables 1 and 2 can also be combined, whereby the mapping table also indicates the data unit to which each particular GUID identifier refers.

TABLE 2

| GUID | Data |
| --- | --- |
| 10203040 | Email1 |
| 10406080 | SMS2 |
| 15689421 | Picture4 |

In accordance with a preferred embodiment, the mediator MED allocates client-specific identifiers (LUID) that are considerably shorter (4 to 5 bytes) than the GUID identifiers to the data unit to be used in the client device TE instead of the TE allocating them itself. A certain identifier range can be defined for each client device TE, in order for the LUID identifiers to be unambiguous, too. An LUID identifier can comprise a server-specific part, for instance 3 bits, and a 29-bit identifier that is determined in a consecutive manner. The client terminal TE itself can also quite autonomically allocate the LUID identifiers. In such a case, however, duplicates can be formed when different client devices synchronize the same data unit for the synchronization server, and it may not be possible to delete the duplicates despite the comparison of mapping tables if the servers do not synchronize with each other.

The mediator MED can operate in the following ways, for example:

The mediator communicates with the server S without LUID identifiers, in other words it replaces on the basis of the mapping table it maintains the LUID identifiers of the client device for the data units with corresponding GUID identifiers. In the opposite direction, the MED replaces the GUID identifiers of the server with corresponding LUID identifiers and allocates new LUID identifiers, if required. The client device TE does not allocate LUID identifiers but uses the identifiers (LUID) it receives directly from the mediator MED. With regard to the server S, the mediator MED is another server, with which no LUID identifiers are required. If the server S requires use of LUID identifiers, the LUID identifiers can be defined in such a way that LUID (x)=GUID (x) for all data units x, or otherwise in such a manner that an LUID identifier can be derived directly from a GUID identifier.

The mediator MED replaces the GUID identifiers (when a data unit is new to the client device) in messages arriving from the server S with an identifier GUID' indicative of the new LUID identifier it has allocated, from which the client device TE being aware of mediators can conclude which LUID identifier is to be allocated. The client device TE allocates this LUID identifier and continues with a MAP operation in accordance with the SyncML standard. The MED can, for example, send the client device TE the GUID identifier 'UUID/1234', from which the client device TE being aware of the use of mediators concludes that it has to allocate the LUID identifier '1234' to this data unit. This implementation supports the SyncML standard, in other words the client device TE allocates the LUID identifiers; the selection of the identifier is only determined by the instructions of the mediator MED. If the client device TE cannot allocate the determined LUID identifier, for instance because such an LUID identifier is already used by the client device, it can also refuse to allocate the identifier. In such a case, the server S provides the client device TE with a new LUID identifier. The mediator can itself maintain the mapping table of the server S. It is also possible that a mapping table is maintained in the server S, whereby the mediator must have access to the mapping tables. In such a case, the mediator MED also forwards the synchronization messages of the client device TE directly to the server without changing the identifier. The client device TE being aware of the mediators can at the initialization stage of the session according to the SyncML protocol inform about this, so that it is possible for the mediator to know when the client device does not support the use of LUID identifiers indicated by the mediators MED. In such a case, the mediator can limit its functionality only to the comparison of mapping tables; then, however, it is possible that some duplicates are not detected. This may happen if the servers S do not synchronize with each other and the same data unit travels from one server to another through synchronizations performed by different client devices TE. Correspondingly, the mediator MED can at the initialization stage inform the client device TE about itself, whereby the client device being aware of the mediators can process the LUID suggestions from the mediator.

FIG. 4 shows a method according to a preferred embodiment of the invention. In step 401, mapping tables are maintained in servers S. Identifier pairs in the mapping tables are to be compared in order to make the different mapping tables contain the same identifier pairs (to avoid formation of duplicates and/or delete duplicates already formed). The comparison can be made automatically, for instance during the synchronization session between the servers S, or at predetermined intervals. Thus, identifier pairs in the mapping tables to be compared are retrieved 402 and compared 403 with each other. On the basis of the comparison, mapping tables in different servers S are updated in such a way that at least part of the identifier pairs in the mapping tables are caused to correspond to each other. This means that if after the previous updating time a data unit has been added to a server, which data unit has been allocated a pair of identifiers (at least a GUID identifier), this pair of identifiers is also added to other mapping tables.

In accordance with a preferred embodiment of the invention, a method according to steps 401 to 405 is used to detect duplicates already formed. Duplicates can be formed if the servers S synchronize directly with each other in such a way that the information on LUID identifiers is not transmitted (mediators MED are not used). A prerequisite for detecting duplicates is that the servers S maintain the GUID identifiers of data units in synchronizations between the servers S. Since there may be several duplicates for one data unit, each pair of identifiers must be compared with all other identifier pairs. Here, an indexing technique known as such can be utilized, in other words the identifier pairs of the mapping tables are put in order according to both the LUID identifiers and the GUID identifiers. If in the comparison 403 (at least) two data units have the same LUID identifier and/or the same GUID identifier and if they refer to different data units, the same data unit, as regards the contents, has been stored (at least) twice, i.e. the data units are duplicates. In such a case, one data unit is selected to be stored, and its duplicates are indicated to be deleted in the next synchronization round. The server preferably maintains a change log, on the basis of which, in the next synchronization round, a synchronization message can be sent in which the duplicates indicated by the GUID and LUID identifiers recorded in the log are commanded to be deleted by means of a replace operation. Once detected, the duplicates can be deleted 405 from the database (TE, DB) in which they have been stored. In the following synchronization rounds, the duplicates are deleted 405 also from other devices in accordance with the deletion made in the database synchronized by the server on the basis of the comparison of mapping tables.

Preferably, the identifier pairs having referred to duplicates of the selected data unit are, however, kept in the mapping table even after the duplicates have been deleted, so that formation of new duplicates can be prevented. Thus, several GUID identifiers can refer to the same data unit, i.e. Table 2 is updated for instance in such a way that two GUID identifiers refer to the data unit 'Email 1'. However, only one pair of identifiers remains active, the rest being alias identifier pairs that can be deleted later on. When such alias identifier pairs are found, they can be replaced with an active identifier. For instance, if the client device TE later synchronizes a data unit having an alias LUID, this alias LUID must be replaced with an active LUID. This may require that the data unit be first deleted and then added in such a way that it is identified with a new LUID identifier. It is possible to store alias identifier pairs limitlessly, but this requires extra memory capacity. Preferably, alias identifier pairs are stored for a predetermined period of time t, whereby changing the value of t allows controlling the required memory space and, on the other hand, reliability. When mediators MED are used, it is further possible that the mediator MED deletes the alias identifier pairs referring to duplicates only after it can conclude that there is no duplicates left for the same data unit in any of the servers S or client devices TE known to it. This information can be derived by keeping a list of all possible client devices and servers in the mediators. When the mediator MED has after the detection of duplicates updated the identifier pairs with all such mediators a server of which can synchronize with the server S served by said mediator MED without a mediator (and, in addition, all client devices TE have synchronized with the mediator MED), it is known that there are no duplicates anywhere. It is to be noted that even if the server and the client list maintained by the mediator MED is incomplete, the use of the present method still alleviates the loop problem.

In accordance with a preferred embodiment of the invention, mediators are used. Comparison 403 and updating 404 can be implemented for instance in such a way that one or more mediators send 402 the identifier pairs in their mapping tables to a comparing mediator, which compares the received identifier pairs with the identifier pairs of its own mapping tables and updates its own table. When the comparing mediator has detected the differences, it adds the missing identifier pairs to its own mapping table and sends the information on the identifier pairs to be added to other mediators, which attend to the updating 404 of the mapping tables. This comparison is preferably performed separately from the synchronization session, whereby there will be no delay in the synchronization due to the comparison of the mapping tables. The updating of mediators can be performed during the synchronization of conventional servers, or as a function separate from the synchronization.

The mediators MED can detect the formed duplicates during the comparison 403 of the identifier pairs in the mapping tables in the above-described manner. The search for duplicates can be performed independently in each mediator. In such a case, there must be a uniform practice, according to which the remaining data unit is selected from the duplicates, so that the same decision is made in all mediators, for instance selecting the first one in 'alphabetical order'. Detection of duplicates can also be performed in a centralized manner; in other words, when the comparing mediator has detected the duplicates, it sends the information on the duplicates to be deleted to other mediators, which attend to deletion 404 of the duplicates and update 405 their mapping tables.

If one mediator MED maintains mapping tables for different servers, it can rapidly compare 403 the identifier pairs of the mapping tables and detect the duplicates. The mediator MED sends on the basis of the comparison 405 the information on one or more duplicates to be deleted (on the basis of their GUID identifier) to the synchronization agent SA of the server. The server S can thus delete the duplicates from the database (DB, or from its own memory). When the server S synchronizes next time with the client device TE, for example, also the identical duplicate possibly in it is deleted: when the mediator MED receives the information on deletion of the data unit (GUID=10203040) from the server, the information on the deletion of the data unit (LUID=12) is sent to the client device TE. In accordance with the SyncML protocol, this is done by using the command 'Delete'.

In accordance with a preferred embodiment of the invention, the servers S synchronize with each other through mediators MED. Thus, during the synchronization, also the LUID identifier is transferred with the data unit to be synchronized. If no LUID identifier has been allocated to the data unit, it must be allocated during the synchronization; in other words the data unit should not be allowed to leave the server without an LUID identifier allocated to it. This guarantees that if an LUID is allocated to a particular data unit somewhere, the LUID is used elsewhere as well. If the GUID identifiers stay in the synchronization between different servers, they can also synchronize without mediators. Duplicates can thus be formed, but they are detected in the above-described manner.

In the synchronization between the servers S, a first mediator thus adds to the identification information of the data unit to be synchronized not only the GUID identifier but also the LUID identifier being the pair to the GUID identifier in the mapping table. A second mediator receiving the synchronization message compares 403 the received identifier pair with the identification pairs of its own mapping table. If any of the identifier pairs in the mapping table have a GUID and/or LUID identifier identical to the GUID and/or LUID identifier of the received data unit, it is possible on the basis of this to prevent (406) the recording (add operation) of the received data unit or to allocate it to the correct data unit (replace operation). Thus, mapping tables of the servers S to be synchronized are updated in such a way that at least the identifier pairs of the data units to be synchronized are caused to correspond to each other. This embodiment provides the significant advantage that already the creation of the duplicates can be prevented. Recording can be prevented 406 only if the adding of the data unit in question is requested. In this way, the recording of the modified data units can be guaranteed. In the SyncML protocol, the recording of a data unit determined by the command 'Add' can thus be prevented.

If the servers S use different (incompatible) GUID identifiers, the synchronization must always be performed through mediators MED so as to prevent creation of duplicates and detect the created duplicates. If the synchronization of the servers always takes place through mediators, the GUID identifier can be left out from the synchronization, if desired, because it can be different in different servers, and the data unit can be identified unambiguously on the basis of the LUID identifier allocated by the mediator and the user identifier. The user identifier to which the data units belong must also be transmitted in connection with the synchronization. If the synchronization between the servers always takes place through mediators, there is no need to update the mapping tables to correspond to each other (i.e. step 404 needs not be performed), because the GUID identifiers can be different in different servers (i.e. a single data unit can have different GUID identifiers in different servers). Thus, the storing of the received data unit can be prevented directly on the basis of the comparison 403 if the data unit according to the LUID identifier allocated to said data unit is detected to have already been stored on the basis of the comparison of the mapping tables. It is to be noted that if the servers do not maintain the GUID identifiers in the synchronization and if mediators MED are not used, duplicates cannot be prevented nor detected. Thus, the server must be configured in such a way that it does not synchronize directly (without mediators) with the servers that do not maintain the GUID identifiers in the synchronization.

Figure 5:
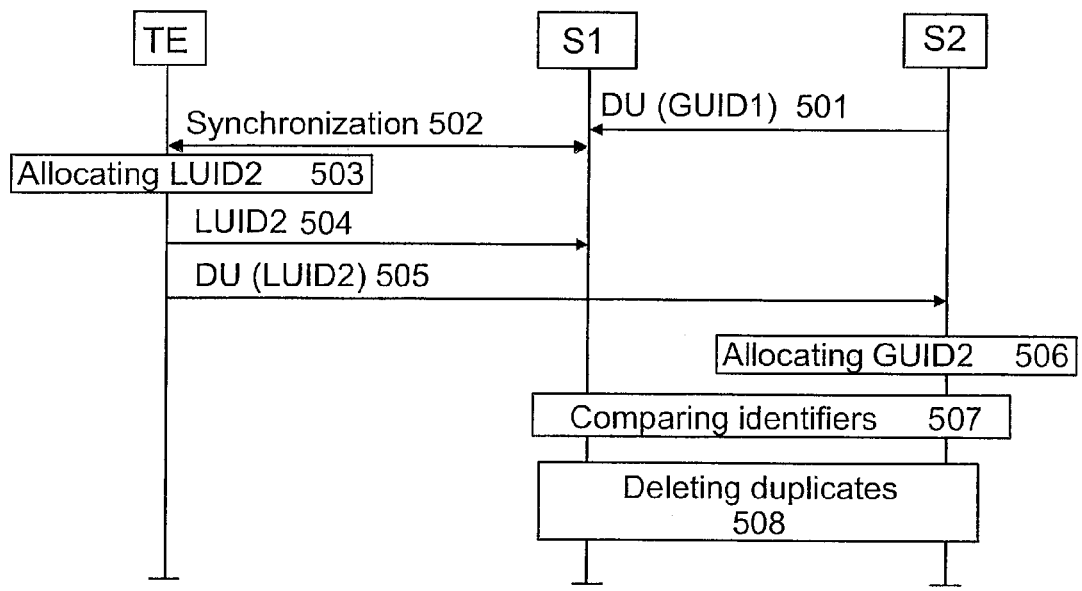
FIG. 5 illustrates some synchronization events.

FIG. 5 illustrates some synchronization events as a result of which duplicates are formed. In the server S2, there is a data unit DU, to which a GUID GUID1 and an LUID LUID1 have been allocated. Synchronization is performed between the servers S1 and S2, whereby the data unit DU is transferred 501 from the S2 to the S1 (LUID is not transferred in the synchronization between the servers). The S1 synchronizes 502 with the client device TE, whereby the client device allocates 503 a new identifier LUID2 to the received data unit DU without identifiers. The TE updates 504 it to the server S1 (MAP operation), after which there is an identifier pair (GUID1, LUID2) in the mapping table of the S1. The client device TE synchronizes with the server S2, whereby it transfers 505 the data unit DU with the identifier (LUID2) to the server S2. The S2 allocates 506 a new identifier GUID2 to the data unit, because there is no corresponding GUID identifier for the identifier LUID2. After this, there are two copies of the same data unit in the server S2, and identifier pairs (GUID1, LUID1) and (GUID2, LUID2) in the mapping table. Thus, a chain (GUID1, LUID1), (GUID1, LUID2) and (GUID2, LUID2) is formed of the duplicates, which can be detected with comparison 507 of mapping tables according to a preferred embodiment of the invention, illustrated above, and the duplicates can be deleted 508.

If, in the example of FIG. 5, the synchronization 501 were performed through mediators MED, the formation of duplicates would have been prevented: information on LUID1 would have been transferred to the mediator of the S2, and the mediator would have been able to add LUID1 to the data unit to be synchronized in the client device.

It will be obvious to a person skilled in the art that with the advance of technology, the basic idea of the invention can be implemented in a plurality of ways. The invention and its embodiments are thus not limited to the above-described examples but can vary within the scope of the claims.

The invention claimed is:

1. A method of detecting duplicates that are created during a synchronization process in a synchronization system comprising at least one synchronization client block, a mediator block and at least two synchronization server blocks, the method comprising:
   defining by the mediator block first identifiers for use in the synchronization client block to data units to be synchronized;
   arranging use of the first identifiers defined by the mediator block in the synchronization client block to identify the data units in the synchronization client block;
   allocating to the data units to be synchronized second identifiers for use in a synchronization server block;
   maintaining by the mediator block mapping tables for the synchronization server blocks by adding to the mapping tables the first identifiers and the second identifiers allocated to the data units to be synchronized via the synchronization server blocks;
   comparing by the mediator block identifier pairs formed by the first and second identifiers added to the mapping tables of different synchronization server blocks;
   causing by the mediator block at least part of the identifier pairs of the mapping tables to correspond to each other; and
   detecting duplicates on the basis of the comparison.

2. A method according to claim 1, wherein
   the system comprises a first mediator and a second mediator, where
   the first mediator is configured to send the identifier pairs of its mapping table to the second mediator; and
   the second mediator is configured to compare the identifier pairs of the first mediator with the identifier pairs of its mapping table and to inform the first mediator on the duplicates it has detected.

3. A method according to claim 1, further comprising:
   deleting at least one duplicate during the next synchronization session as a response to at least two data units having the same first identifier and/or the same second identifier in the mapping table.

4. A method according to claim 1, further comprising:
defining for storing one data unit detected on the basis of the comparison of the mapping tables and a pair of identifiers referring to it;
arranging the identifier pairs referring to the duplicates of said data unit to refer to said data unit; and
deleting the identifier pairs referring to the duplicates of said data unit after a predetermined time.

5. A method according to claim 1, wherein the identifier pairs of at least the data units under synchronization are caused to correspond to each other; and
the recording of a data unit is prevented as a response to the first and/or second identifier allocated to said data unit being already defined in the mapping table.

6. A method according to claim 1, wherein the synchronization of the data units is arranged in accordance with the SyncML standard, whereby the first identifiers are LUID identifiers (Local Unique Identifier) and the second identifiers are GUID identifiers (Global Unique Identifier).

7. A method of detecting duplicates that are created during a synchronization process in a synchronization system comprising at least one synchronization client block, a mediator block and at least two synchronization server blocks, the method comprising:
defining by the mediator block first identifiers for use in the synchronization client block;
arranging use of the first identifiers defined by the mediator block in the synchronization client block to identify the data units in the synchronization client block;
allocating to the data units to be synchronized second identifiers for use in the synchronization server blocks;
maintaining by the mediator block mapping tables for the synchronization server blocks by adding to the mapping tables the first identifiers and the second identifiers allocated to the data units to be synchronized via the synchronization server blocks;
comparing by the mediator block identifier pairs formed by the first and second identifiers added to the mapping tables of different synchronization server blocks;
detecting duplicates on the basis of the comparison;
preventing duplicated recording of the data unit under synchronization as a response to a data unit according to the first identifier allocated to said data unit being already recorded on the basis of the mapping tables.

8. A synchronization system comprising at least one synchronization client blocks, at least two synchronization server blocks, and at least one mediator block wherein
the mediator block is configured to define a first identifier for use in the synchronization client block to a data unit to be synchronized;
the mediator block is configured to provide the first identifier for the synchronization client to arrange use of the first identifier in the synchronization client block to identify the data unit in the synchronization client block;
the system is configured to allocate for the data units to be synchronized second identifiers for use in a synchronization server block,
the mediator block is configured to maintain mapping tables for the synchronization server blocks by adding to the mapping tables first identifiers and second identifiers allocated to the data units to be synchronized via the synchronization server blocks;
the mediator block is configured to compare identifier pairs formed by the first and second identifiers added to the mapping tables of different synchronization server blocks;
the mediator block is configured to detect duplicates that are created during a synchronization process on the basis of the comparison; and
the mediator block is configured to cause at least part of the identifier pairs in the mapping tables to correspond to each other.

9. A synchronization device for a synchronization system comprising at least one synchronization client block and synchronization server blocks, said synchronization device comprising:
a mediator block configured to:
define first identifiers for use in the synchronization client block to data units to be synchronized;
provide the first identifiers for the synchronization client block to arrange use of the first identifiers in the synchronization client block to identify the data units in the synchronization client block;
maintain mapping tables for the synchronization server blocks by adding to the mapping table first identifiers and second identifiers allocated to the data units to be synchronized via the synchronization server blocks, an allocation of the second identifiers being arranged in the system for data units to be synchronized for use in a synchronization server block;
compare identifier pairs formed by the first and second identifiers added to the mapping tables of different synchronization server blocks;
cause at least part of the identifier pairs of the mapping tables to correspond to each other; and
detect duplicates that are created during a synchronization process on the basis of the comparison.

10. A computer program product comprising a memory medium, said computer program product comprising program code for execution in a processor of a computer, for causing the computer to provide a mediator block configured to:
define first identifiers for use in a synchronization client block to data units to be synchronized;
provide the first identifiers for the synchronization client to arrange use of the first identifiers in the synchronization client block to identify the data units in the synchronization client block;
maintain at least one mapping table for at least one synchronization server, the mapping table comprising for the data units to be synchronized first identifiers for use in a synchronization client and second identifiers for use in a synchronization server;
compare identifier pairs formed by the first and second identifiers of different mapping tables;
detect duplicates that are created during a synchronization process on the basis of the comparison; and
cause at least part of the identifier pairs in the mapping table to correspond to each other.

11. A synchronization device for a synchronization system comprising synchronization clients and synchronization servers, said synchronization device comprising:
a mediator block configured to:
define first identifiers for use in the synchronization client block to data units to be synchronized;
provide the first identifiers for the synchronization client to arrange use of the first identifiers in the synchronization client block to identify the data units in the synchronization client block;

maintain at least one mapping table for at least one synchronization server, the mapping table comprising for the data units to be synchronized first identifiers for use in a synchronization client and second identifiers for use in the synchronization server;

compare identifier pairs formed by the first and second identifiers;

cause at least part of the identifier pairs of the mapping table to correspond to each other;

detect duplicates that are created in a synchronization process on the basis of the comparison;

communicate with a second mediator in the synchronization system;

send the identifier pairs of the mapping table to the second mediator; and/or compare identifier pairs of the second mediator with the identifier pairs of the mapping table and to inform the second mediator on the duplicates the mediator block has detected.

12. A synchronization device as claimed in claim 11, wherein the synchronization device is configured to cause deletion of at least one duplicate during the next synchronization session as a response to at least two data units having the same first identifier and/or the same second identifier in the mapping table.

13. A synchronization device as claimed in claim 9, wherein the synchronization device is configured to cause the identifier pairs of at least the data units under synchronization to correspond to each other; and the synchronization device is configured to cause prevention of the recording of a data unit as a response to the first and/or second identifier allocated to said data unit being already defined in the mapping table.

14. A synchronization device as claimed in claim 9, wherein the synchronization device is configured to comply with the SyncML standard, whereby the first identifiers are LUID identifiers (Local Unique Identifier) and the second identifiers are GUID identifiers (Global Unique Identifier).

15. A data processing device for a synchronization system comprising at least one synchronization client block and synchronization server blocks, said data processing device comprising a synchronization client block, wherein the data processing device is configured to receive from a mediator block a first identifier defined by the mediator block for use in the synchronization client to a data unit to be synchronized to identify the data unit in the synchronization client block;

an allocation of second identifiers being arranged in the system for data units to be synchronized for use in a synchronization server block, the mediator block being configured to maintain at least one mapping table for at least one synchronization server block by adding to the mapping table first identifiers and second identifiers allocated to the data units to be synchronized via the synchronization server blocks, to compare identifier pairs formed by the first and second identifiers added to the mapping tables of different synchronization server blocks, to detect duplicates that are created during a synchronization process on the basis of the comparison, and to cause at least part of the identifier pairs in the mapping tables to correspond to each other; and the synchronization client is configured to use the first identifier received from the mediator to identify the data unit in the synchronization client block and to identify the data unit in later synchronization events.

* * * * *